(12) United States Patent
Liljedahl

(10) Patent No.: US 7,976,086 B2
(45) Date of Patent: Jul. 12, 2011

(54) SAFETY LOCKING DEVICE FOR A LIFTING HOOK

(75) Inventor: Gunnar Liljedahl, Luleå (SE)

(73) Assignee: Liko Research & Development AB, Lulea (SE)

( * ) Notice: Subject to any disclaimer, the term of this patent is extended or adjusted under 35 U.S.C. 154(b) by 250 days.

(21) Appl. No.: 12/298,848

(22) PCT Filed: Apr. 20, 2007

(86) PCT No.: PCT/SE2007/000379
§ 371 (c)(1),
(2), (4) Date: Oct. 28, 2008

(87) PCT Pub. No.: WO2007/126355
PCT Pub. Date: Nov. 8, 2007

(65) Prior Publication Data
US 2009/0206049 A1    Aug. 20, 2009

(30) Foreign Application Priority Data

May 3, 2006 (SE) ........................................ 0600973

(51) Int. Cl.
*B66C 1/36* (2006.01)
(52) U.S. Cl. .................................................. 294/82.19
(58) Field of Classification Search ............... 294/82.17, 294/82.19; 24/599.1, 599.2, 599.6
See application file for complete search history.

(56) References Cited

U.S. PATENT DOCUMENTS

| 264,530 | A | * | 9/1882 | Hammond | 294/82.17 |
| 3,008,210 | A | * | 11/1961 | Stovern | 294/82.19 |
| 3,105,280 | A | * | 10/1963 | Davis | 24/598.4 |
| 4,689,859 | A | * | 9/1987 | Hauser | 294/82.21 |
| 6,907,645 | B2 | * | 6/2005 | Jenson et al. | 24/599.6 |

FOREIGN PATENT DOCUMENTS

| DE | 668343 | 12/1938 |
| FR | 741573 | 2/1933 |
| GB | 1368427 | 9/1974 |
| JP | 2006-153159 | 6/2006 |
| SE | 50291 | 4/1921 |

* cited by examiner

*Primary Examiner* — Paul T Chin
(74) *Attorney, Agent, or Firm* — Dinsmore & Shohl LLP

(57) ABSTRACT

A safety locking device for a lifting hook comprising a lifting part and a hook part having a first and a second shank arranged in the same plane, the first shank being attached to the lifting part. The safety-locking device is pivotably attached to either of the shanks or the lifting part and comprises a spring means formed integrally with the safety locking device, one end of which is attached to the safety locking device diametrically opposed its fastening point to either shank or the lifting part and the other end is arranged to bear on the opposite shank or the lifting part, to which the safety locking device is pivotably attached to automatically bring the safety locking device to bear on the lifting part or the opposite shank so as to prevent unhooking of a hoisting cable or similar means introduced into the hook part.

15 Claims, 2 Drawing Sheets

SAFETY LOCKING DEVICE FOR A LIFTING HOOK

FIELD OF THE INVENTION

The present invention relates to a safety locking device for a lifting hook according to the preamble of claim 1.

BACKGROUND OF THE INVENTION

It is known to provide lifting hooks with safety locking devices. However, these safety locking devices comprise several parts, such as locking means and locking springs, for instance, to close the safety locking device against the lifting hook itself. The safety locking device is thereby complicated to manufacture and install at the lifting hook.

SUMMARY OF THE INVENTION

The object of the invention is to achieve a safety locking device for a lifting hook, which device is easy to manufacture, install and comprises only one component part.

Said object is achieved according to the invention in that the safety locking device for a lifting hook comprises a lifting part and a hook part having a first and a second shank arranged in the same plane, the first shank being joined to the lifting part, the safety locking device being pivotably attached to either of the shanks or the lifting part and comprises a spring means formed integrally with the safety locking device to automatically bring the safety locking device to bear against the lifting part or the opposite shank for preventing unhooking of a hoisting cable or similar means introduced into the hook part, said safety locking device having a general U-shape with two legs, characterized in that the spring means is elongated and fixed at one of its ends to that part of the U-shaped safety locking device which connects the two legs of the U, and that the other part of the spring means is arranged to bear on either of the shanks or the lifting part of the lifting hook.

BRIEF DESCRIPTION OF THE DRAWINGS

A non limiting example of the invention will now be described with reference to the accompanying drawings, in which.

DESCRIPTION OF PREFERRED EMBODIMENTS

Figure 1:
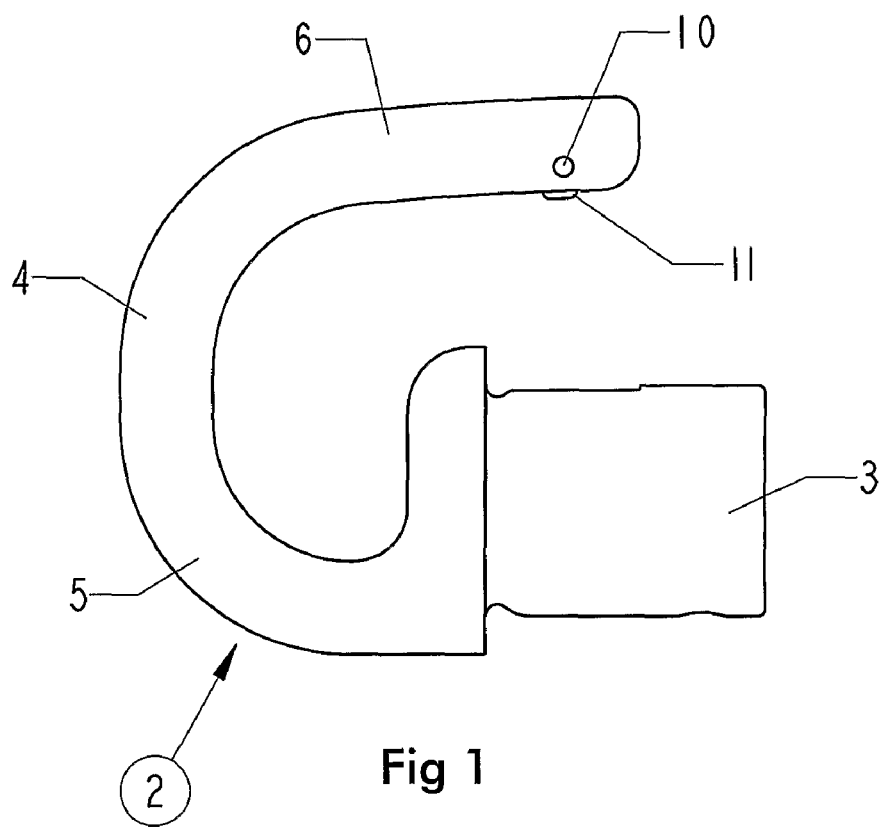
FIG. 1 is a side view of a lifting hook without the safety locking device according to the invention.

FIG. 1 shows a lifting hook 2 without a safety locking device 1 according to the invention. In this figure the preferred location of a hole 10 for pivotable supporting of the safety locking device 1 is shown, which hole 10 will be described below. A protrusion 11 is arranged on the side of a shank 6 facing a lifting part 3 of the lifting hook 2.

Figure 2:
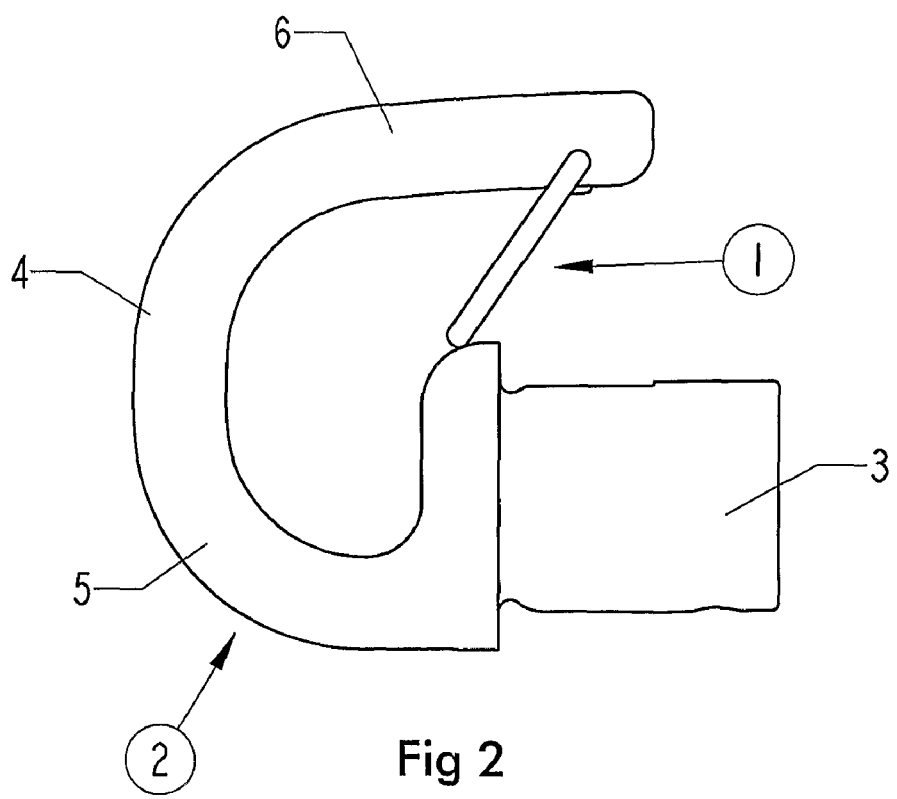
FIG. 2 is a side view of a lifting hook provided with the safety locking device according to the invention.

FIG. 2 shows the safety locking device 1 for the lifting hook 2, preferably a lifting hook intended for lifting patients within medical services, and comprises a lifting part 3 and a hook part 4, which comprises a first and a second shank 5, 6, the first shank 5 being connected to the lifting part 3, and the second shank 6 extends beyond at least a portion of the lifting part 3, i.e. the second shank 6 is longer than the first shank 5. Preferably the first shank 5 is formed integrally with the lifting part 3. The safety locking device 1 is pivotably attached to one of the shanks 5, 6 of the lifting hook 2 or the lifting part 3.

Figure 3:
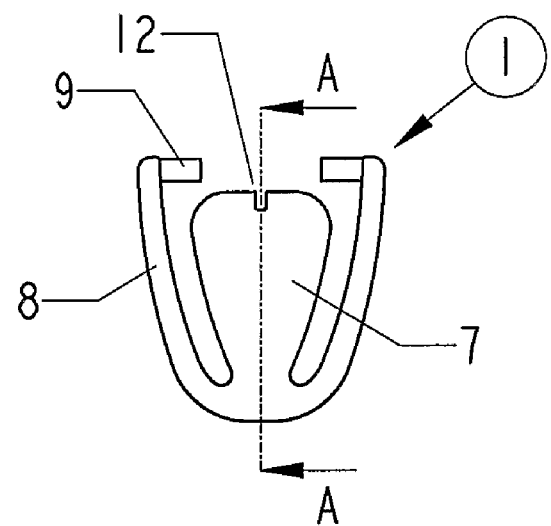
FIG. 3 is a front view of the safety locking device according the invention.

As seen in FIG. 3 the safety locking device 1 is provided with an elongated spring means 7 which is formed integrally with said safety locking device. The safety locking device 1 has generally U-shape, and one end of the elongated spring means 7 is attached to that part of the U-shaped safety locking device which connects the two legs 8 of the U. The other free end of the spring means is arranged to bear against the shank or the lifting part at which it is pivotably attached, and said end of the spring means 7 is provided with a preferably centrally situated recess 12 adapted to cooperate with the protrusion 11 on the shank 6 for preventing the safety looking device from disengaging in the case of an impact sideways on the safety locking device.

Figure 4:
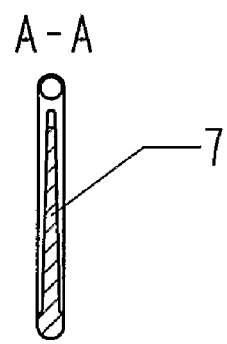
FIG. 4 is a sectional view along the line A-A in FIG. 3.
Figure 5:
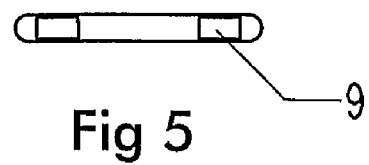
FIG. 5 is a view from above of the safety locking device in FIG. 3.

Furthermore, the spring means 7 and the two legs 8 of the U are arranged in the same plane as can be inferred from FIGS. 4 and 5. It is obvious for the man skilled in the art that the spring means and the legs of the U can be so arranged that they form an angle, not shown, between themselves to either increase or decrease the spring action of the spring means 7.

The respective legs 8 of the safety locking device are provided with pivot pins 9 facing each other at the end of the shanks of the U opposite the attachment point for the spring means, which pivot pins are adapted to cooperate with diametrically opposed and complementary arranged holes 10 in the second shank 6. The holes 10 are preferably arranged at a suitable distance from the hook part 4, as can be seen in FIG. 1. In an embodiment (not shown) the holes 10 can be arranged in the first shank 5, whereby the length of the respective shanks has to be adapted accordingly.

By choosing material and thickness of material of the spring means 7, and adapt the thickness of the material between the edge of the hole 10 and the edge of the shank 6, faced towards the opposite shank, the degree of spring action of the safety locking device can be adapted according to the requirements.

The safety locking device 1 should be made of a resilient material, preferably a plastic material.

A safety locking device 1 designed according to the above results in that the end of the safety locking device arranged opposite to its fastening end at the shank 6 will automatically be brought to bear against the lifting part 3 or the opposite shank.

The invention claimed is:

1. Safety locking device for a lifting hook comprising a lifting part and a hook part having a first and second shank arranged in the same plane, the first shank being attached to the lifting part, the safety locking device being pivotably attached to the second shank and comprises a spring means formed integrally with the safety locking device and arranged to automatically bring the safety locking device to bear on the opposite shank for preventing unhooking of a hoisting cable or similar means introduced into the hook part, said safety locking device having a general U-shape with two legs, characterized in that the spring means is elongated and attached at one of its ends to that part of the U-shaped safety locking device which connects the two legs of the U, and that a free end of the spring means is arranged to bear on the second shank of the lifting hook, and wherein the second shank is provided with a protrusion facing the first shank, and the free end of the spring means is provided with a recess adapted to cooperate with the protrusion to prevent the safety locking device from disengaging from the second shank.

2. Safety locking device according to claim 1, characterized in that the spring means and the two legs of the U are arranged in the same plane.

3. Safety locking device according to claim 1, characterized in that the spring means and the two legs of the U are so arranged that they form an angle between themselves for either increasing or decreasing the spring action of the spring means.

4. Safety locking device according to claim 1, characterized in that the respective legs of the safety locking device are provided with diametrically opposed pivot pins adapted to cooperate with complimentary recesses arranged in the second shank.

5. Safety locking device according to claim 1, characterized in that the second shank of the lifting hook extends past the lifting part.

6. A lifting hook comprising:
   a lifting part and a hook part having a first shank and a second shank arranged in a U-configuration in the same plane, the first shank being attached to the lifting part and the second shank having a length greater than a length of the first shank such that the second shank extends past at least a portion of the lifting part, the second shank comprising a protrusion arranged on the side of the second shank facing the lifting part; and
   a safety locking device pivotally attached to the second shank, the safety locking device comprising a pair of legs oriented in a U-shape and an elongated spring having a first end integrally formed with the pair of legs, a free end arranged to bear on the first shank, and a recess cooperating with the protrusion of the second shank to prevent disengagement of the safety locking device, wherein the elongated spring biases the safety locking device against the first shank preventing a hoisting cable from being unhooked from the hook part.

7. The lifting hook of claim 6, wherein the elongated spring and the pair of legs of the safety locking device are arranged in the same plane.

8. The lifting hook of claim of claim 6, wherein the elongated spring and the pair of legs of the safety locking device are non-planar with one another.

9. The lifting hook of claim 6, wherein the pair of legs of the safety locking device are provided with diametrically opposed pivot pins cooperating with complimentary recesses formed in the second shank.

10. A lifting hook comprising:
    a lifting part and a hook part having a first shank and a second shank arranged in a U-configuration in the same plane, the first shank being attached to the lifting part and the second shank having a length greater than a length of the first shank such that the second shank extends past at least a portion of the lifting part; and
    a safety locking device pivotally attached to the second shank, the safety locking device having a pair of legs oriented in a U-shape and an elongated spring positioned between the pair of legs, the elongated spring having a first end integrally formed with the pair of legs and a free end arranged to bear on the first shank, wherein the elongated spring biases the safety locking device against the first shank preventing a hoisting cable from being unhooked from the hook part.

11. The lifting hook of claim 10, wherein the elongated spring and the pair of legs of the safety locking device are arranged in the same plane.

12. The lifting hook of claim of claim 10, wherein the elongated spring and the pair of legs of the safety locking device are non-planar with one another.

13. The lifting hook of claim 10, wherein the pair of legs of the safety locking device are provided with diametrically opposed pivot pins cooperating with complimentary recesses formed in the second shank.

14. The lifting hook of claim 10, wherein the second shank is longer than the first shank such that the second shank of the lifting hook extends past at least a portion of the lifting part.

15. The lifting hook of claim 10, wherein:
    the second shank comprises a protrusion arranged on the side of the second shank facing the lifting part; and
    the safety locking device comprises a recess cooperating with the protrusion of the second shank to prevent disengagement of the safety locking device from the second shank.

* * * * *